J. DUNN.
CLAMPS FOR ATTACHING HEMMERS, BINDERS, &c., TO SEWING MACHINES.

No. 169,530. Patented Nov. 2, 1875.

Witnesses
Chas. H. Smith
Geo. T. Pinchney

Inventor
John Dunn
per Lemuel W. Serrell
atty

UNITED STATES PATENT OFFICE.

JOHN DUNN, OF PHILADELPHIA, PENNSYLVANIA.

IMPROVEMENT IN CLAMPS FOR ATTACHING HEMMERS, BINDERS, &c., TO SEWING-MACHINES.

Specification forming part of Letters Patent No. 169,530, dated November 2, 1875; application filed August 16, 1875.

*To all whom it may concern:*

Be it known that I, JOHN DUNN, of Philadelphia, in the State of Pennsylvania, have invented an Improvement in Clamps for Attaching Hemmers, Binders, &c., to Sewing-Machines, of which the following is a specification:

Hemmers, binders, &c., have been attached to sewing-machines by a slotted arm or bar, by which to adjust the position of the same upon the bed-plate, and in some instances the hemmer has been provided with a vertical cylindrical projection, around which is bent a clamping-bar, that also forms the attaching device. In this attachment the angle at which the hemmer stands to this clamping-bar cannot be easily changed, because the clamping-bar has to be loosened from the sewing-machine and opened before the adjustment can be effected.

My invention is made for avoiding these difficulties, and consists in an expansive cylindrical nut applied at the end of the slotted attaching-arm, and an eye in the plate of the hemmer or other sewing-machine attachment, whereby the hemmer is clamped in place by the expansible nut; but the friction can be lessened by unscrewing the conical screw, so that the hemmer can be easily positioned without removing the slotted arm from the plate.

Figure 2:
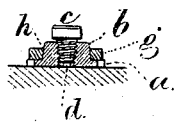
Figure 1:
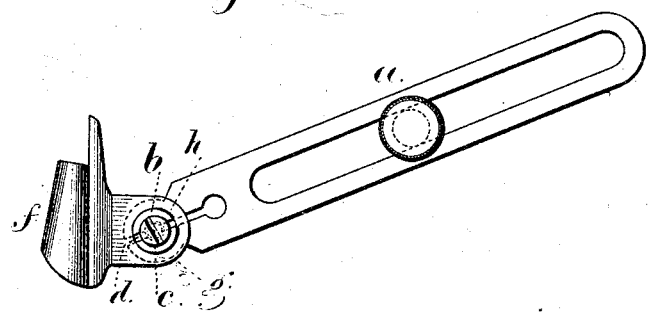
Figure 3:
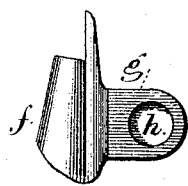

In the drawing, Figure 1 is a plan of the parts complete. Fig. 2 is a section of the expansive cylindrical nut, and Fig. 3 shows the hemmer-plate and the eye therein.

The slotted arm or plate $a$ is of any usual character, and it is adapted to be attached to the bed or plate of a sewing-machine by a clamp-screw. At or near one end of this plate $a$ is a cylindrical nut, $b$, in which is a tapering screw, $c$, and the nut is divided by the slit $d$, so that it can be expanded by screwing in the screw $c$, or the reverse. The hemmer $f$ is of any desired character, and it is connected to the plate $g$; or a binder, braider, corder, or other sewing-machine attachment may be connected to a similar plate, $g$. There is an eye, $h$, in this plate $g$, and it is of a size to fit upon the cylindrical nut $b$, and by screwing in the screw $c$ the nut will be expanded sufficiently to firmly hold the hemmer or other attachment in whatever position to the arm $a$ it may be placed.

This construction of clamping device allows the operator to disconnect one attachment and substitute a different hemmer, binder, corder, or braider, and to adjust the parts to position and clamp them firmly by simply operating the screw $c$ and the screw that attaches the slotted arm $a$ to the sewing-machine.

I claim as my invention—

The expansible cylindrical nut $b$ and tapering screw $c$ upon the slotted arm $a$, in combination with the plate $g$, having an eye, $h$, and carrying a hemmer or other sewing-machine attachment, as and for the purposes set forth.

Signed by me this 9th day of August, 1875.

JOHN DUNN.

Witnesses:
EDWIN F. GLENN,
MARCUS H. MINES.